(12) United States Patent
Koizumi et al.

(10) Patent No.: US 12,497,117 B2
(45) Date of Patent: Dec. 16, 2025

(54) BELL FOR BICYCLE

(71) Applicant: Koizumi Factory Corporation, Takaoka (JP)

(72) Inventors: Toshihiro Koizumi, Takaoka (JP); Saki Maeda, Takaoka (JP)

(73) Assignee: Koizumi Factory Corporation, Takaoka (JP)

( * ) Notice: Subject to any disclaimer, the term of this patent is extended or adjusted under 35 U.S.C. 154(b) by 647 days.

(21) Appl. No.: 17/864,386

(22) Filed: Jul. 13, 2022

(65) Prior Publication Data

US 2022/0348279 A1 Nov. 3, 2022

Related U.S. Application Data

(63) Continuation of application No. PCT/JP2020/048344, filed on Dec. 24, 2020.

(30) Foreign Application Priority Data

Jan. 14, 2020 (JP) ................. 2020-003344

(51) Int. Cl.
B62J 3/04 (2020.01)
G10K 1/072 (2006.01)

(52) U.S. Cl.
CPC .............. B62J 3/04 (2020.02); G10K 1/072 (2013.01)

(58) Field of Classification Search
CPC .................................. B62J 3/04; G10K 1/072
See application file for complete search history.

(56) References Cited

U.S. PATENT DOCUMENTS

| 525,153 | A | * | 8/1894 | Mattyes | B60Q 1/22 |
| | | | | | 116/60 |
| 571,777 | A | * | 11/1896 | Lucas | B62J 3/04 |
| | | | | | 116/159 |
| 616,015 | A | * | 12/1898 | Rockwell | B62J 3/04 |
| | | | | | 116/159 |
| 5,921,669 | A | * | 7/1999 | Taylor | B62J 6/00 |
| | | | | | 362/396 |

(Continued)

FOREIGN PATENT DOCUMENTS

| FR | 1025526 | A | * | 4/1953 |
| JP | T14-12233 | Y1 | | 4/1925 |
| JP | H0665182 | U | * | 3/1994 |
| JP | 3018712 | U | * | 11/1995 |

(Continued)

OTHER PUBLICATIONS

EP 1403849 A2; Sperber, "Small Bell With Strap For Wearing On User's Arm Has Plastics Baseplate Attached To Flexible Plastics Strap And Has External Clapper Mounted On Spring And Actuated By User's Finger" 2002. (Year: 2002).*

(Continued)

Primary Examiner — Kristina M Deherrera
Assistant Examiner — Tania Courson
(74) Attorney, Agent, or Firm — David L. Hoffman; Nolan Heimann LLP

(57) ABSTRACT

A bell for a bicycle includes: an attaching tool configured to be attached to a handle of a bicycle; a bell main body directly or indirectly connected to the attaching tool; and a hitting member configured to hit and ring the bell main body, wherein the hitting member is a plate body or a case body and is elastically supported by the bell main body or the attaching tool.

7 Claims, 18 Drawing Sheets

(56) References Cited

U.S. PATENT DOCUMENTS

| | | | |
|---|---|---|---|
| 7,182,039 B2 * | 2/2007 | Ichimura | G10K 1/072 |
| | | | 116/167 |
| 8,822,800 B1 * | 9/2014 | Richmond | G10D 13/10 |
| | | | 84/422.4 |
| 9,633,643 B1 * | 4/2017 | Bilanenko | B62J 3/04 |
| 12,043,335 B2 * | 7/2024 | Hu | G10K 1/10 |
| 2016/0163301 A1 | 6/2016 | Pan | |
| 2020/0017157 A1 | 1/2020 | Gallois et al. | |

FOREIGN PATENT DOCUMENTS

| | | | |
|---|---|---|---|
| JP | 2580455 Y2 | | 9/1998 |
| JP | H11180360 A | * | 7/1999 |
| JP | 2001-83972 A | | 3/2001 |
| JP | 6441974 B2 | | 12/2018 |
| JP | 2024075131 A | * | 6/2024 |
| TW | 200824956 A | * | 6/2008 |
| WO | WO2018154228 A1 | | 8/2018 |

OTHER PUBLICATIONS

JP 2006232026 A: Kubo, "Bell For Use To Attach In Handle Bar Of Bicycle Has Protrusion Provided In Rack Converting Vertical Motion Of Press Member Into Reciprocating Motion Of Dentition", 2006. (Year: 2006).*

International Search Report, in application No. PCT/JP2020/048344, mailed Mar. 9, 2021, 5 pages.

Extended European Search Report, in application No. EP 20913945, dated Jul. 18, 2023, 6 pages.

* cited by examiner

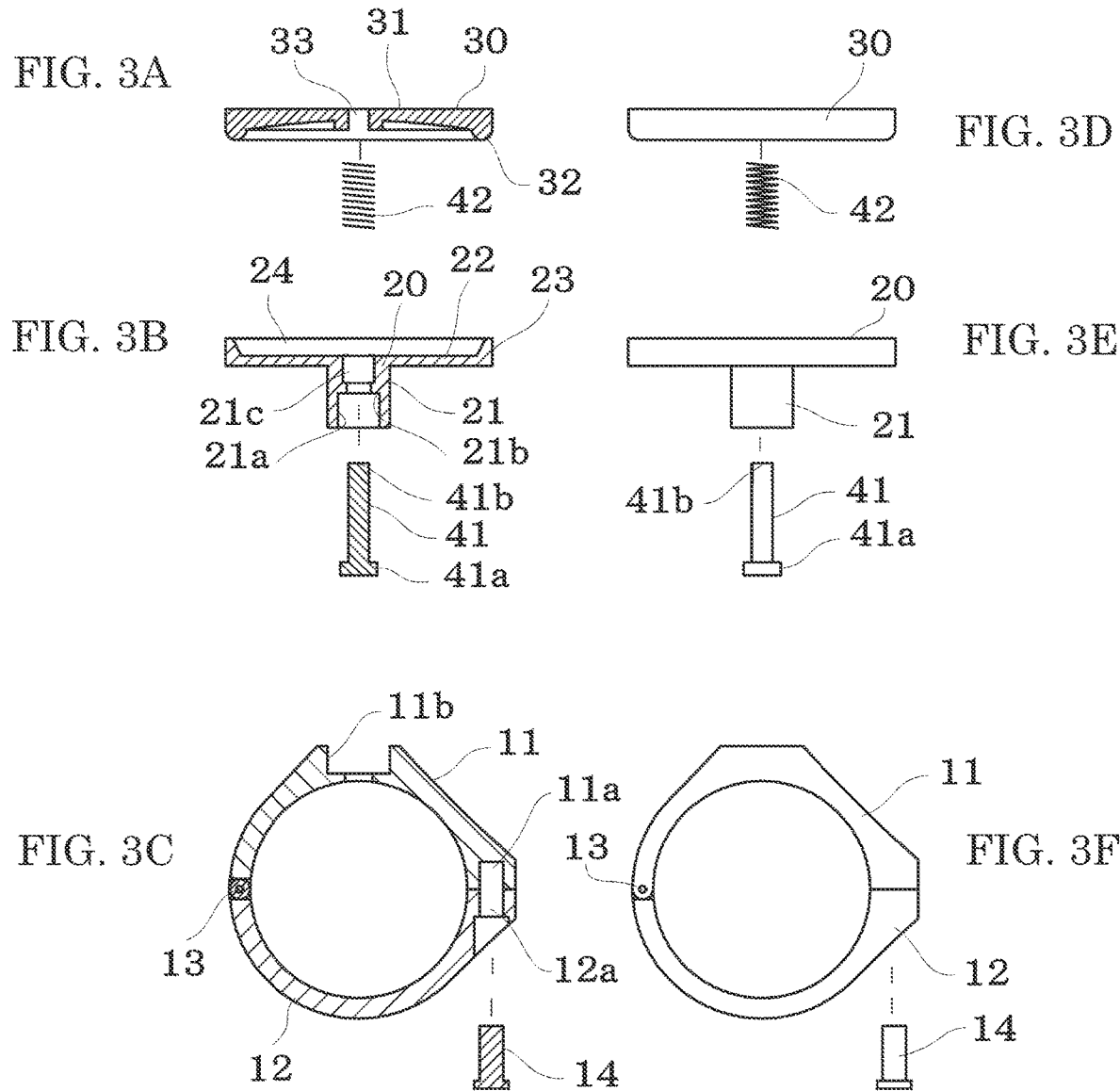

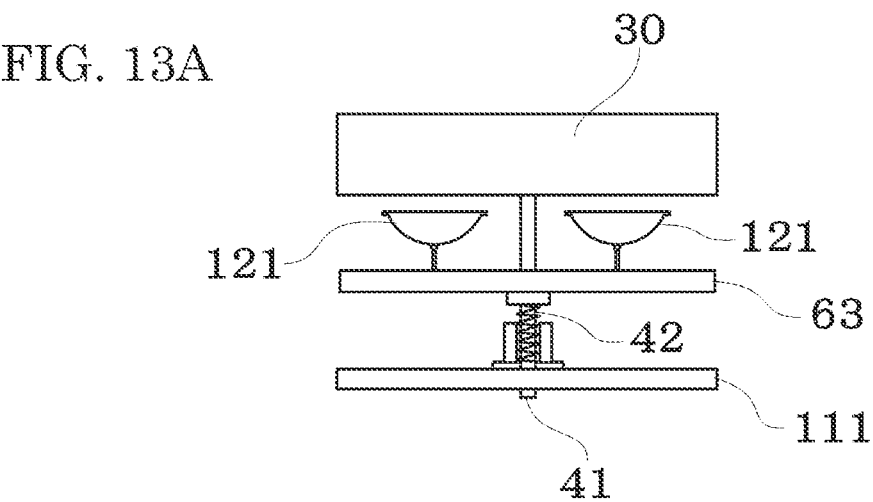
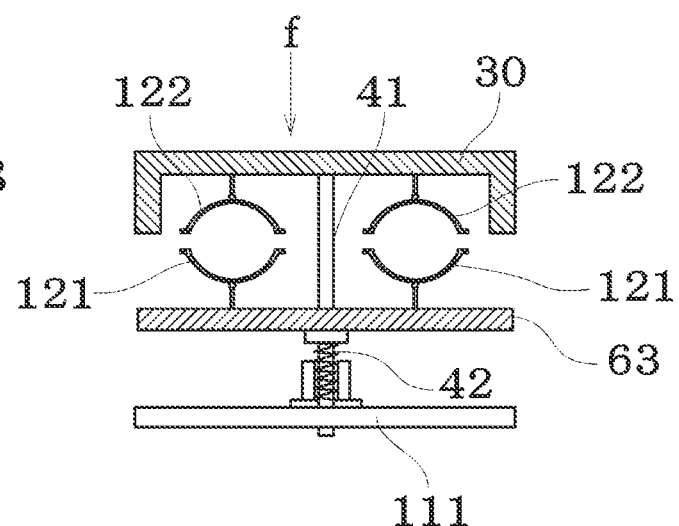

BELL FOR BICYCLE

CROSS REFERENCE TO RELATED APPLICATION

This application is a continuation of International Patent Application No. PCT/JP2020/048344, having an international filing date of Dec. 24, 2020, which designated the United States, the entirety of which is incorporated herein by reference. Japanese Patent Application No. 2020-003344 filed on Jan. 14, 2020 is also incorporated herein by reference in its entirety.

TECHNICAL FIELD

The present disclosure relates to a bell used by being attached to a handle or the like of a bicycle.

BACKGROUND ART

Bells for a bicycle proposed so far are a hammer-like striker as illustrated in Patent JP-B-6441974 and a hitting element in a spherical shape as disclosed in Japanese utility model registration No. 2580455, for example.

In order to hit a bell main body with such a hammer-like striker or a hitting element in the spherical shape, an operation of separating the striker or the hitting element away from the bell main body with a fingertip is needed and there are no problems in particular when there is time to make the fingertip standby at a position of the striker or the hitting element beforehand, but it is a problem that it is difficult to ring the bell when it is urgent.

An object of the disclosure is to provide a bell for a bicycle that makes it easy to ring the bell and is also excellent in design.

BRIEF DESCRIPTION OF THE DRAWINGS

FIG. 2A is a sectional view in an attaching direction to a handle of a bicycle, and FIG. 2B is a sectional view in a direction orthogonal to the handle.

FIGS. 3A to 3C illustrate a configuration example of parts, where FIG. 3A is a vertical sectional and exploded view of a hitting member, FIG. 3B is a vertical sectional and exploded view of a bell main body, and FIG. 3C is a vertical sectional and exploded view of an attaching tool.

FIGS. 3D to 3F illustrate a configuration example of parts, where FIG. 3D is an elevated and exploded view of a hitting member, FIG. 3E is an elevated and exploded view of a bell main body, and FIG. 3F is an elevated and exploded view of an attaching tool.

FIGS. 13A and 13B illustrate an example of configuring the bell main body by a plurality of bell elements erected from a base member and forming a plurality of hitting elements on a back side of the hitting member, and the present embodiment illustrates an example of operating the hitting elements also as a plurality of bell elements (embodiment 5).

DESCRIPTION OF EXEMPLARY EMBODIMENTS

Figure 1:
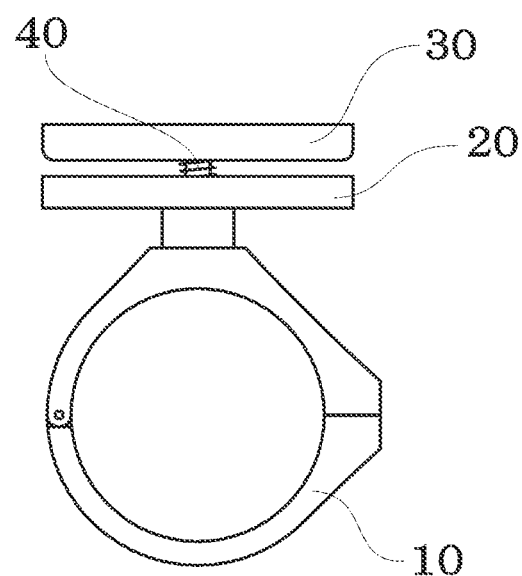
FIG. 1 illustrates a structure example (embodiment 1) of a bell for a bicycle according to the present disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between. Further, when the first element is described as "moving" relative to the second element, such description includes embodiments in which at least one of the first element and the second element moves relative to the other.

In accordance with one of some embodiments, the bell for a bicycle includes: an attaching tool configured to be attached to a handle of a bicycle; a bell main body directly or indirectly connected to the attaching tool; and a hitting member configured to hit and ring the bell main body, and the hitting member is a plate body or a case body and is elastically supported by the bell main body or the attaching tool.

As a result, in some embodiments, the hitting member is the plate body or the case body and is elastically supported so that the bell is rung just by lightly hitting the plate body or the case body from above, for example.

In accordance with one of some embodiments, the hitting member may be the plate body and may be arranged opposite to the bell main body at a predetermined interval.

Thus, the bell is rung just by lightly hitting a part of the hitting member formed of the plate body from above, for example.

In accordance with one of some embodiments, an aim of making the bell main body or the case body elastically support the hitting member is for lightly hitting the hitting member toward the bell main body as described above, the hitting member may be directly connected to the bell main body or the attaching tool by an elastic member such as a spring or elastic rubber, or it may be indirect elastic support of connecting the hitting member to the bell main body by a shaft or the like and energizing the hitting member in a separating direction by an elastic member such as a spring or the like.

In accordance with one of some embodiments, the hitting member may be the case body and the bell main body may be disposed on an inner side of the case body.

In accordance with one of some embodiments, the bell main body may be in a dish shape or a shallow bowl shape.

In such a manner, sound is made just by lightly hitting the hitting member so as to strike an outer edge of the bell main body.

In accordance with one of some embodiments, the bell main body may be opposite to the hitting member and may be in a plate shape including a raised portion at the outer edge, and a hitting member center and a bell main body center may be offset-arranged in this case.

When a bottom of the bell main body is in the plate shape and includes the raised portion along the outer edge, an outer shape thereof is not limited and may be a circle, a rectangle, a square, a star shape or a polygon or the like.

In this case, the hitting member preferably includes a hitting projection raised toward the bell main body.

Further, when the bell main body has a thickness difference between a thick portion and a thin portion or the like, or has holes or slits or the like, it is possible to change magnitude and tones of the sound.

In addition, for example, it is possible to change the magnitude and tones of the sound by mutually turnably connecting the hitting member and the bell main body and thereby allowing changing hitting positions of each other.

In this case, the hitting member and the bell main body can be made continuously turnable, or can be made turnable stepwise by using a latch mechanism or the like.

Further, for example, preferable sound may be selected by making the hitting member and the bell main body slidable to each other in a left-right or front-back direction or the like and changing a sliding amount.

Since the present disclosure is characterized in that the bell is rung by lightly hitting the hitting member, the bell main body may include a plurality of bell elements or the hitting member may include a plurality of hitting elements so that the bell is rung by the hitting elements hitting the bell elements, further the hitting member may be supported by a shaft member and include a plurality of hitting elements operated to move forward and backward to/from the bell main body by up-down movements of the shaft member.

The bell for a bicycle according to the present disclosure makes it possible to ring the bell just by lightly hitting the hitting member with a hand or a finger and easily ring the bell even when it is urgent.

A structure example of a bell for a bicycle according to the present disclosure will be described based on the drawings, however, the present disclosure is not limited thereto.

Figure 2A:
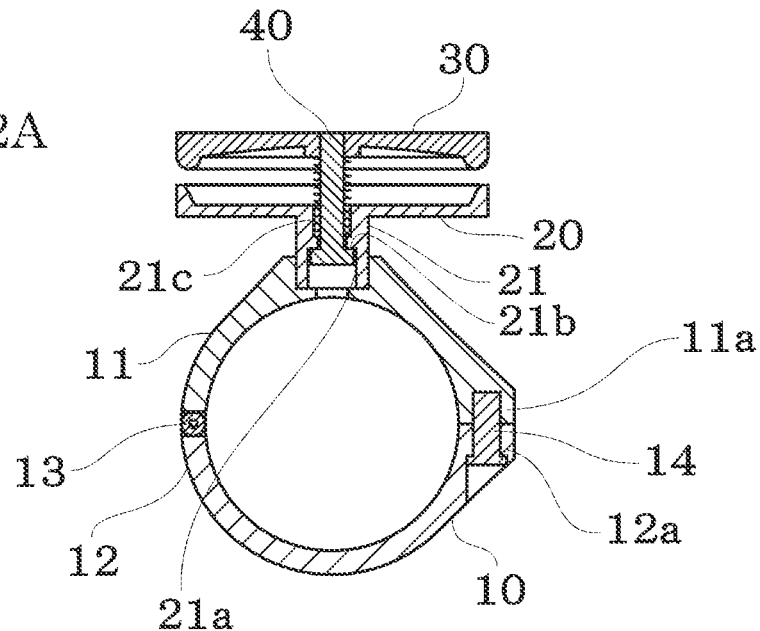
FIGS. 2A and 2B illustrate a sectional view of the bell for a bicycle of the embodiment 1.
Figure 2B:
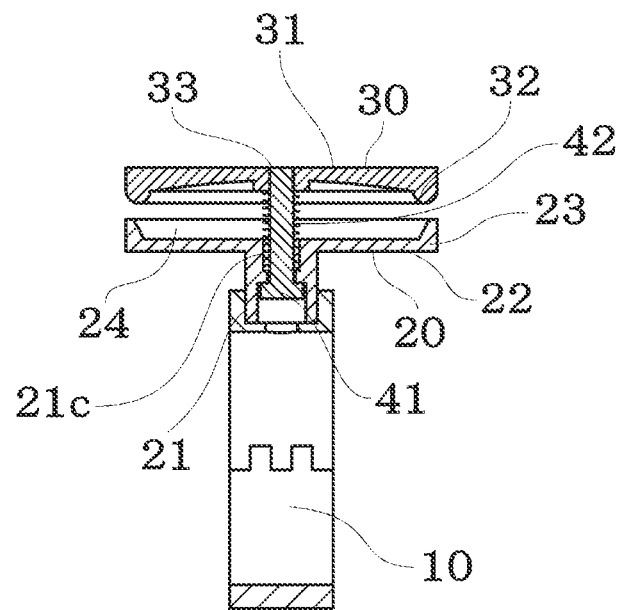
Figure 4A:
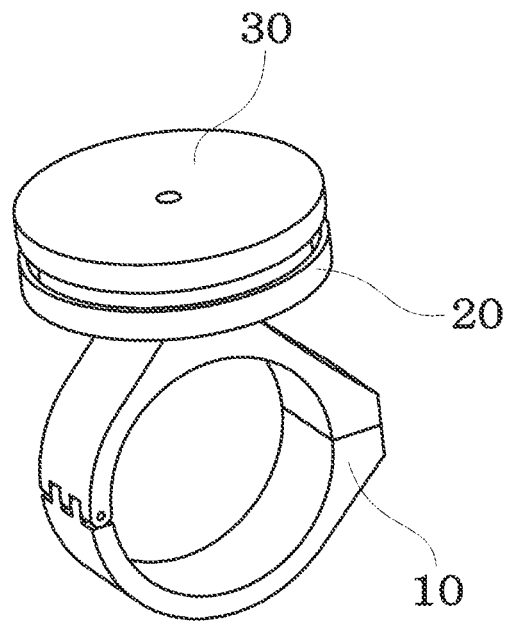
FIG. 4A illustrates a perspective view of the bell from above.
Figure 4B:
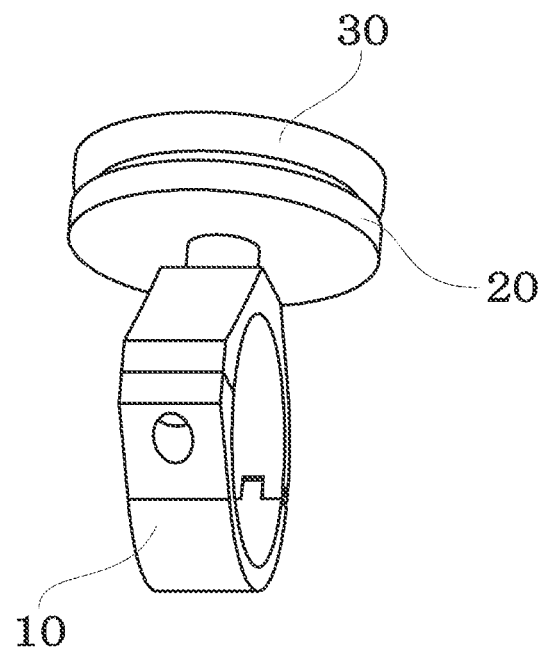
FIG. 4B illustrates a perspective view of the bell from below.

A side view of the bell is illustrated in FIG. 1, a sectional view of the bell is illustrated in FIGS. 2A and 2B, a parts configuration example is illustrated in the vertical sectional exploded views of FIGS. 3A to 3C and the elevated exploded views of FIGS. 3D to 3F and an external perspective view of the bell is illustrated in FIGS. 4A and 4B, respectively (embodiment 1).

The bell for a bicycle according to one of some embodiments includes an attaching tool 10 for attachment to a handle of a bicycle, and a bell main body 20 connected to the attaching tool.

Above the bell main body 20, a hitting member 30 is oppositely arranged in parallel at a predetermined interval.

The hitting member 30 is an example that is connected to a shaft member 41 in a bolt shape as illustrated in the sectional view in FIGS. 2A and 2B, and the hitting member 30 is energized in a separating direction (upward) by a spring 42 arranged on an outer periphery of the shaft member 41.

The shaft member 41 is the example that includes a head portion 41a in the bolt shape and a screw portion 41b on a distal end side as illustrated in FIG. 3B.

The shaft member 41 is movable in up-down directions along an insertion hole 21a made at a center of the bell main body 20.

When giving description with FIGS. 3A to 3C, the example is such that the shaft member 41 in the bolt shape is inserted to the insertion hole 21a of the bell main body 20 and is inserted further to the spring 42 and the screw portion 41b at a distal end is screwed to a female screw portion 33 of the hitting member 30.

The head portion 41a of the shaft member 41 is regulated at a step portion 21b made inside the insertion hole 21a of the bell main body 20, and a lower end of the spring 42 is held at a regulator 21c on an upper side of the insertion hole 21a of the bell main body.

Thus, when the hitting member 30 is lightly hit from the upper side with a hand or a finger, the hitting member 30 energized by the spring 42 hits the bell main body 20 and the bell is rung.

While the present embodiment is the example in which an elastic supporter 40 (FIG. 1) is formed of a shaft and a spring, just the hitting member 30 should be elastically supported and the bell main body and the hitting member may be directly connected by an elastic member.

When the hitting member 30 and the bell main body 20 are directly connected by the elastic member, the hitting member 30 is obliquely tilted and hits the bell main body.

In the present embodiment, the example is such that an outer shape of both of the bell main body 20 and the hitting member 30 is a circular shape and the bell main body 20 and the hitting member 30 are arranged opposite to each other.

While the bell main body 20 is the example in which a ring-like raised portion 23 is formed along an outer peripheral edge of a bottom portion 22 in a plate shape, the bell main body 20 may be in a shallow bowl shape or a dish shape when a recessed portion 24 is formed on the inner side.

A material of the bell main body 20 is preferably a metal such as a copper alloy. The hitting member 30 includes a hitting projection 32 at a position opposite to the raised portion 23 of the bell main body along the outer peripheral edge of a base portion 31 in the plate shape.

Figure 5A:
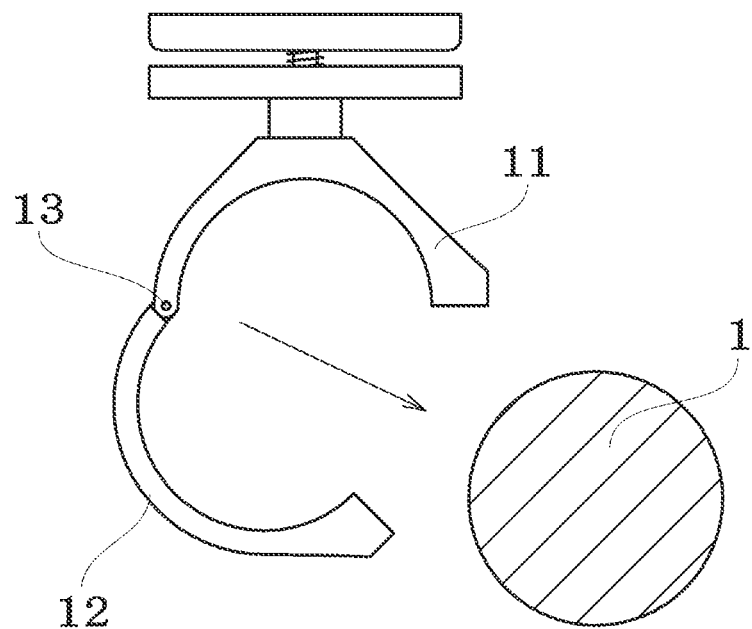
FIGS. 5A and 5B illustrate a procedure of attaching the bell to the handle of the bicycle.
Figure 5B:
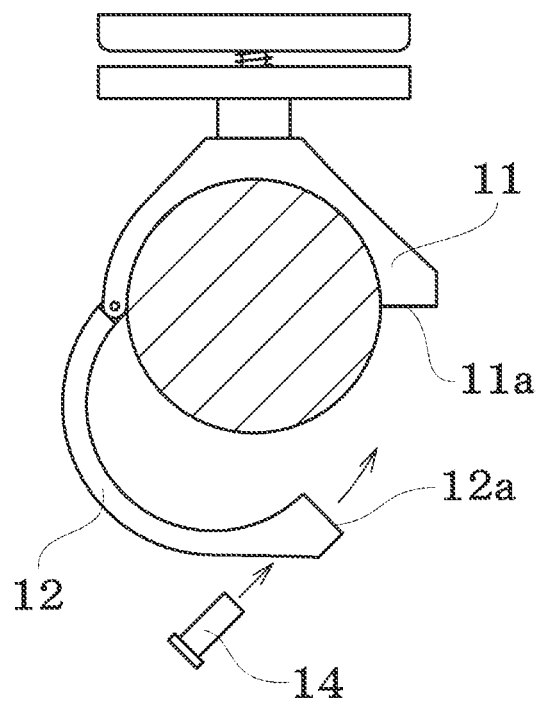

FIGS. 5A and 5B illustrate the example of attaching the bell for a bicycle according to one of some embodiments to a handle.

The attaching tool 10 is the example in which an upper frame 11 and a lower frame 12 in a semicircular shape are made openable and closable at a pivoter 13 as illustrated in FIG. 3C and the upper frame 11 includes an attaching recessed portion 11b that fits a supporter 21 of the bell main body 20, however, an attaching structure of the bell main body 20 is not limited.

As illustrated in FIG. 5A, the example is such that fixation to the handle is performed by spreading portions at one end of the upper frame 11 and the lower frame 12 from each other, attaching the upper frame 11 and the lower frame 12 so as to hold a circumference of a handle 1 and fastening a fastener 11a of the upper frame 11 and a fastener 12a of the lower frame 12 by a fastening member 14 such as a machine screw.

Figure 6A:
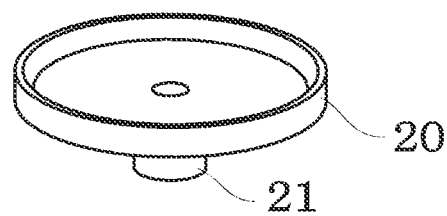
FIG. 6A to FIG. 6C illustrate modifications of the bell main body in a plate shape.
Figure 6B:
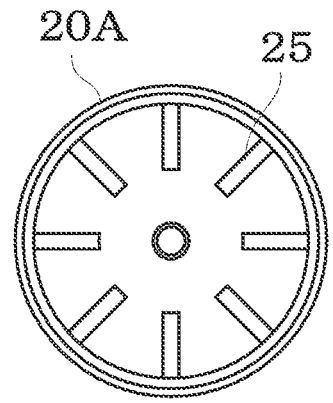
Figure 6C:
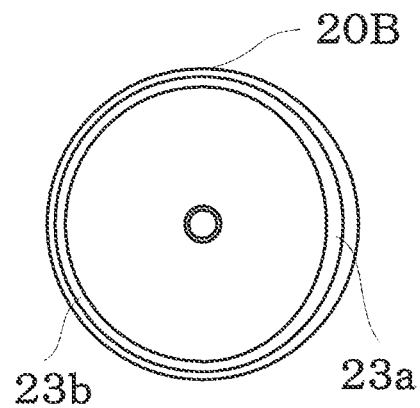

FIGS. 6A to 6C illustrate an application example of the bell main body 20.

FIG. 6B illustrates the example of a bell main body 20A including a slit portion 25. FIG.6C illustrates a bell main body 20B which has a thickness difference between a thick portion 23a and a thin portion 23b or the like for thickness of the raised portion 23. By way of providing a slit portion 25 or a thickness difference, a tone is changed when a hitting position is changed.

The outer shape does not need to be limited to be the circular shape, and may be a square, a rectangle or a polygon or the like.

Figure 7:
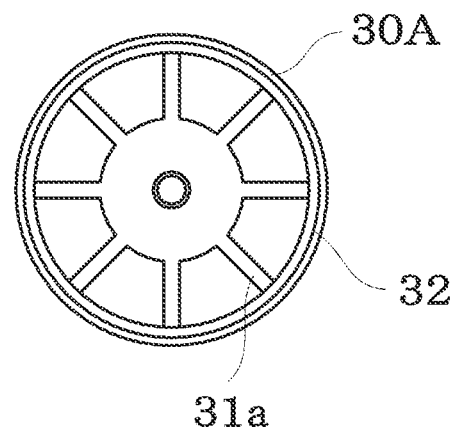
FIG. 7 illustrates a modification of the hitting member.

In addition, the hitting member 30 may be in a vehicle steering wheel shape for which an outer wheel is supported by rims 31a like a hitting member 30A illustrated in FIG. 7 for example as long as the hitting member 30 is arranged opposite to the bell main body 20.

Figure 8:
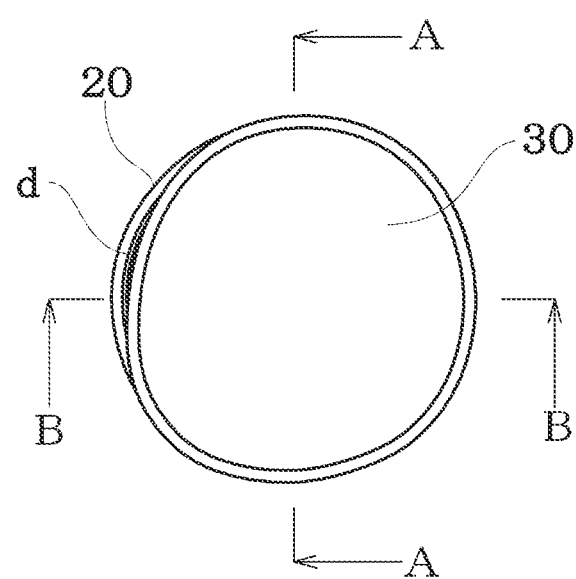
FIG. 8 illustrates a modification of opposite arrangement of the hitting member formed of a plate body and the bell main body in the plate shape.
Figure 9A:
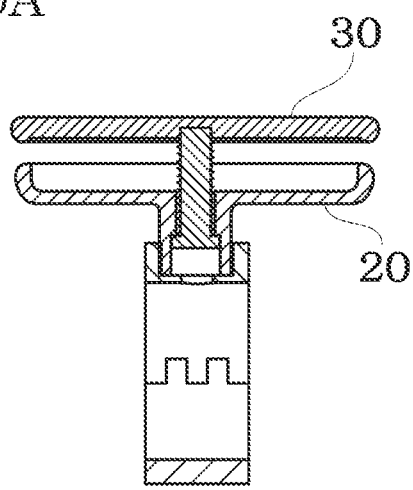
FIG. 9A illustrates an A-A line sectional view in FIG. 8.
Figure 9B:
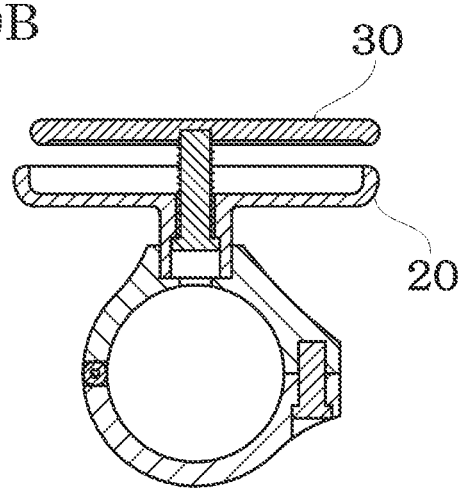
FIG. 9B illustrates a B-B line sectional view.

While the bell main body 20 and the hitting member 30 described above are the example in which the outer shapes are roughly same shapes, by making the outer shape partially elliptic or forming a recessed portion for example for one or both of the hitting member 30 and the bell main body 20 as illustrated in FIG. 8, FIGS. 9A and 9B for example, it may be made easy to transmit the sound generated inside to outside.

In the present embodiment, the example is such that, by arranging an outer edge of the in part of bell main body 20 so as to be slightly projected to an outer side from an outer edge of the other part of hitting member 30 as illustrated in a planar view in FIG. 8, the internal sound is made to easily resonate to the outer side from a part of a clearance "d."

Figure 10A:
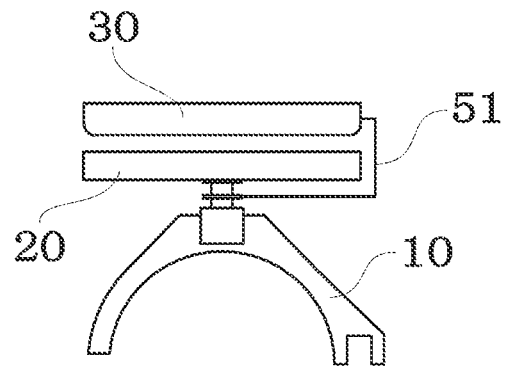
FIGS. 10A to 10C illustrate an example of making an attaching tool elastically support the hitting member (embodiment 2).
Figure 10B:
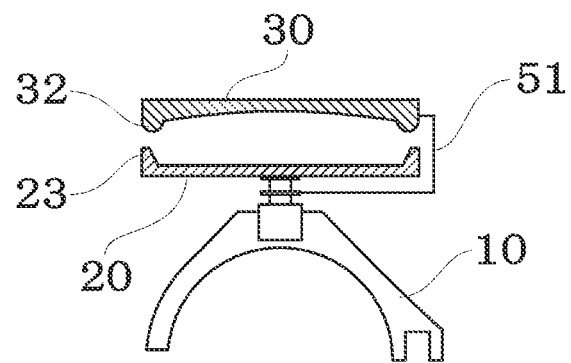
Figure 10C:
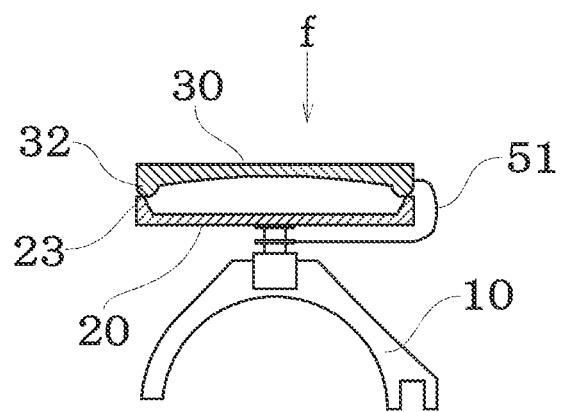

FIGS. 10A to 10C illustrate an embodiment 2 of the bell for a bicycle according to one of some embodiments.

FIG. 10A illustrates an external view of the bell, FIG. 10B illustrates a sectional view of the bell, and FIG. 10C illustrates a hitting state.

The present embodiment is the example in which the hitting member 30 arranged opposite to the bell main body 20 in a circular plate shape at the predetermined interval is supported by the attaching tool 10 by using an elastic member 51 in a wire or a leaf spring shape.

In the present embodiment, the hitting member 30 is elastically supported from a connector connecting the bell main body 20 to the attaching tool 10.

The hitting member 30 is formed of a plate body also in the present embodiment, and when light hitting is performed in a direction "f" in a state of FIG. 10B, the elastic member 51 is deformed and the hitting member 30 hits the bell main body 20 as illustrated in FIG. 10C, however, the hitting member 30 is elastically restored to the state of FIG. 10B thereafter.

FIGS. 11A to 11D illustrates an embodiment 3.

Figure 11A:
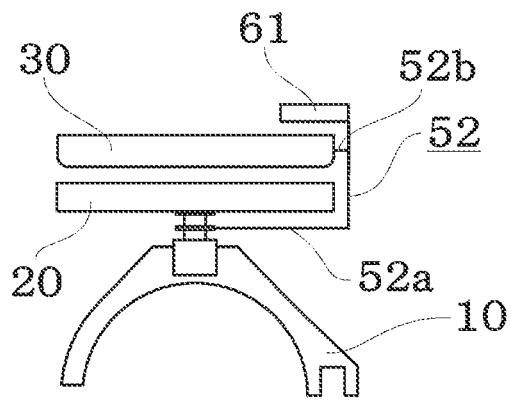
FIGS. 11A to 11D illustrate an example of hitting the hitting member through an operation button (embodiment 3).
Figure 11B:
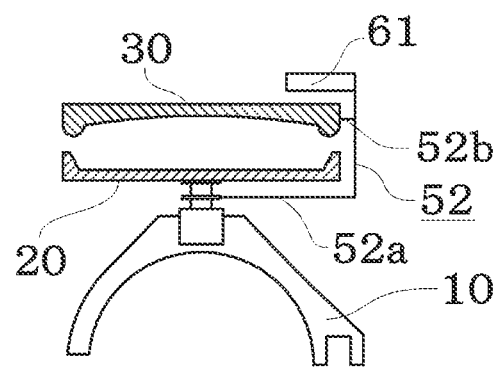
Figure 11C:
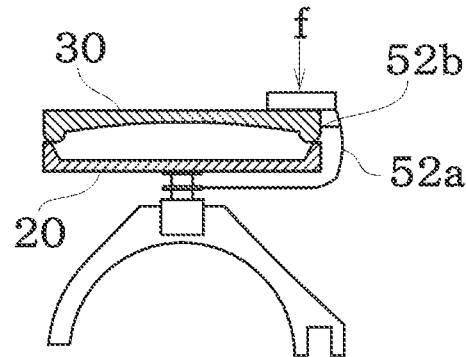
Figure 11D:
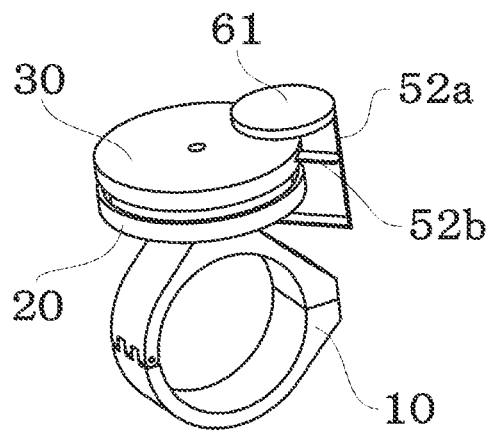

The present embodiment is also the example in which the hitting member 30 is elastically supported by the attaching tool side by an elastic member 52 of a wire or a leaf spring, but is the example in which an operation button 61 is elastically supported by an elastic member 52a and the hitting member 30 is supported by a branched elastic member 52b on a lower side of the operation button 61 as illustrated in a perspective view in FIG. 11D.

In such a manner, the bell is rung when the hitting member 30 is directly hit or also when the operation button 61 is hit.

Figure 12A:
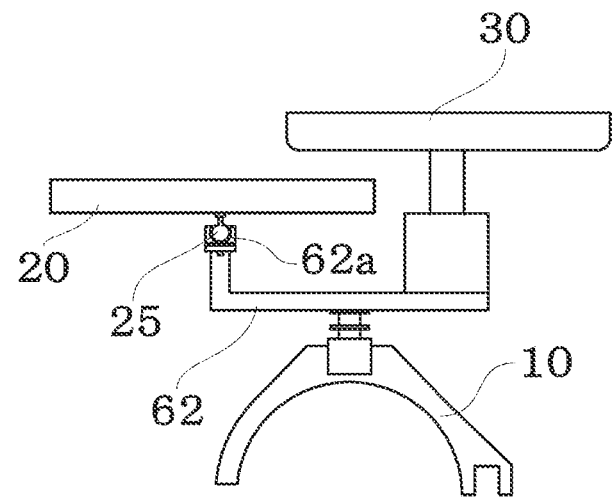
FIGS. 12A to 12C illustrate an example of offset-arranging a center of the hitting member and a center of the bell main body (embodiment 4).
Figure 12B:
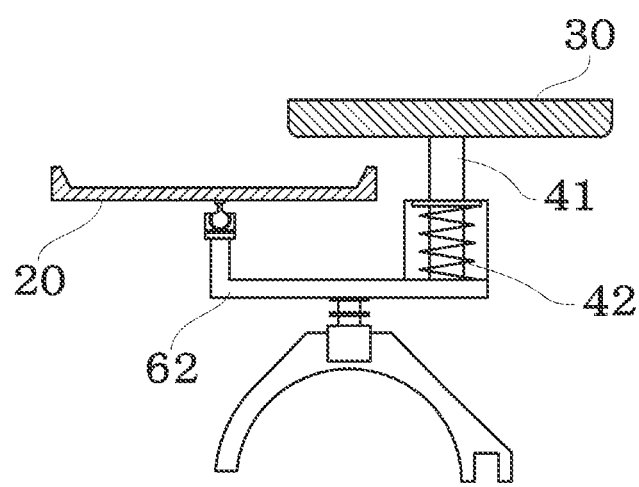
Figure 12C:
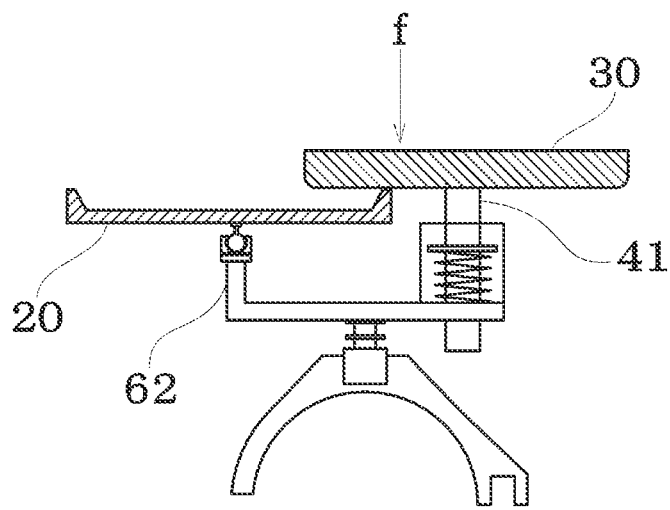

FIGS. 12A to 12C illustrates an embodiment 4.

In the present embodiment, a roughly L-shaped base member 62 is connected to the attaching tool 10.

The example is such that, by forming a spherical recessed portion 62a at one end of the base member 62, a connector 25 in a spherical shape formed on a back surface of the bell main body 20 is brought into slidable contact with the spherical recessed portion 62a and supported.

The example is such that the hitting member 30 elastically supported by the spring 42 via the shaft 41 is arranged at the other end of the base member 62.

In such a manner, when the hitting member 30 offset-arranged with the bell main body 20 is hit in the direction "f" from above, the back surface of the hitting member 30 hits the end of the bell main body 20 and the bell is rung as illustrated from the state of FIG. 12B to the state of FIG. 12C.

Since the bell main body 20 is spherically connected so as to be restored in a horizontal direction, vibrations of the bell main body 20 become long.

FIGS. 13A and 13B illustrates an embodiment 5.

The present embodiment is the example in which a plurality of bell elements 121 as the bell main body are erected from a base member 63 supported by an attaching tool 111 via the shaft 41 and the spring 42.

In the present embodiment, the bell element 121 is in the bowl shape.

In this case, the example is such that the hitting member 30 arranged opposite to the base member 63 is turned to a case body and hitting elements 122 operated also as the bell elements are arranged on the inner side.

Each hitting element 122 is arranged opposite to each bell element 121.

Figure 14A:
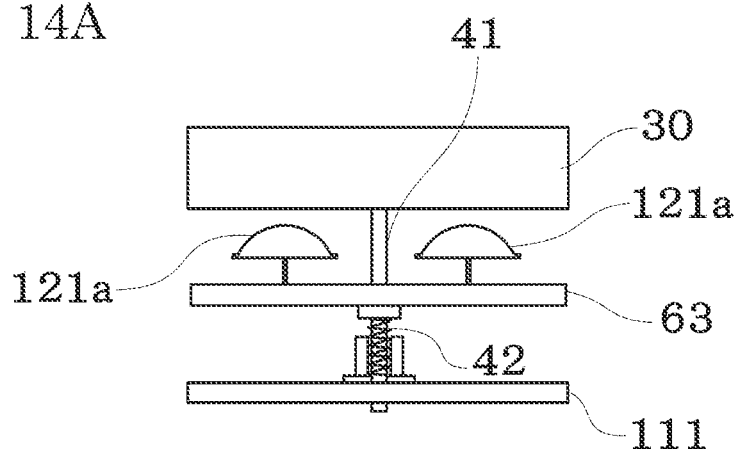
FIGS. 14A and 14B illustrate an example of oppositely arranging the bell elements and the hitting elements in opposite directions relative to FIGS. 13A and 13B (embodiment 6).
Figure 14B:
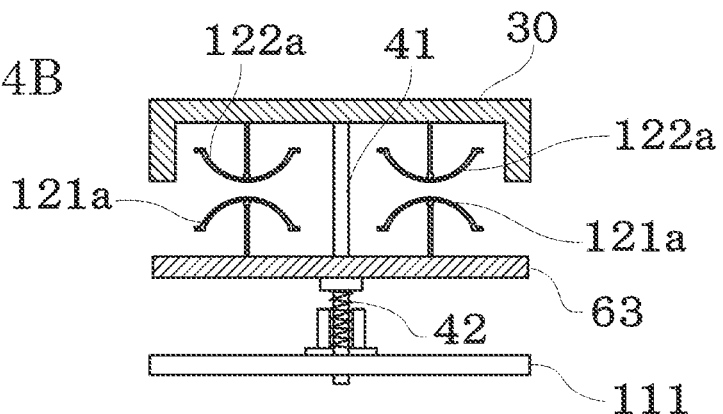

FIGS. 14A and 14B illustrate an embodiment 6.

The present embodiment is a modification of the bell elements and the hitting elements in the embodiment 5, and is the example in which a projected portion of a bell element 121a and a projected portion of a hitting element 122a are oppositely arranged.

Figure 15A:
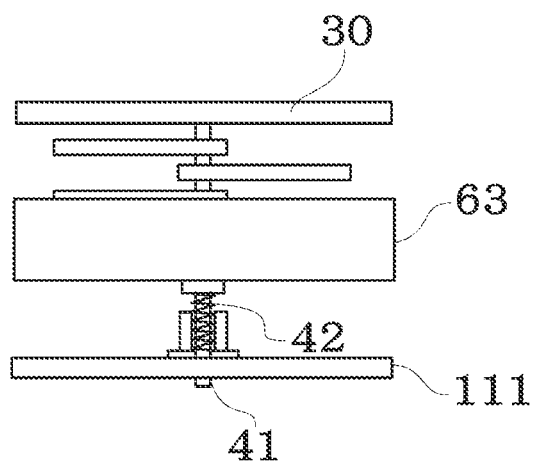
FIGS. 15A and 15B illustrate an example of forming the bell elements on a shaft that supports the hitting member (embodiment 7).
Figure 15B:
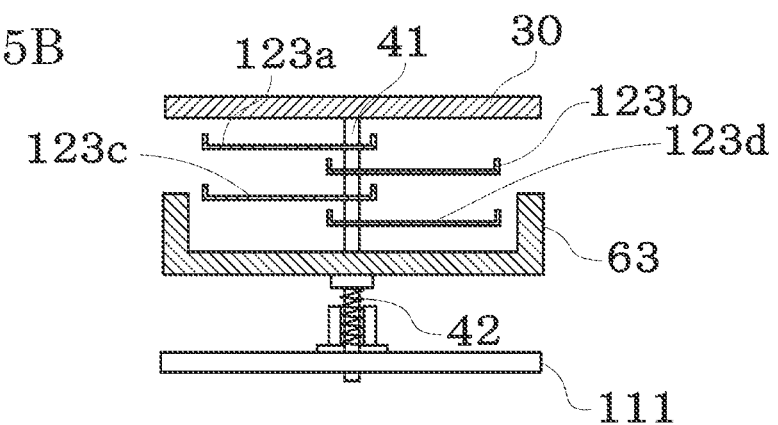

FIGS. 15A and 15B illustrate an embodiment 7.

In the present embodiment, bell elements 123a-123d are arranged on the shaft 41 elastically supporting the hitting member 30 between the base member 63 and the oppositely arranged hitting member 30. Each base end of the bell elements 123a-123d is elastically supported by the shaft 41, and each free end of the bell elements 123a-123d is swingable. When the hitting member 30 is hit, the bell elements in a tambourine shape hit each other and the bell is rung. More specifically, the free end of the bell element 123a and the free end of the bell element 123c hit each other, the free end of the bell element 123b and the free end of the bell element 123d hit, and the bell rings.

Figure 16A:
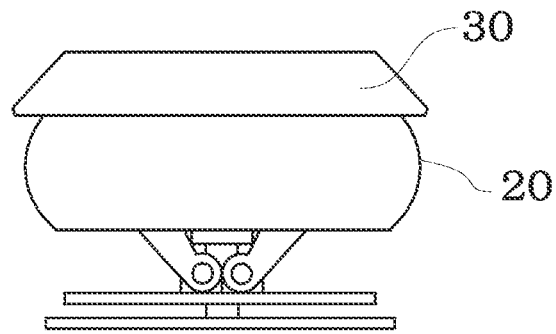
FIGS. 16A to 16C illustrate an example in which the hitting elements are moved linked with the shaft supporting the hitting member (embodiment 8).
Figure 16B:
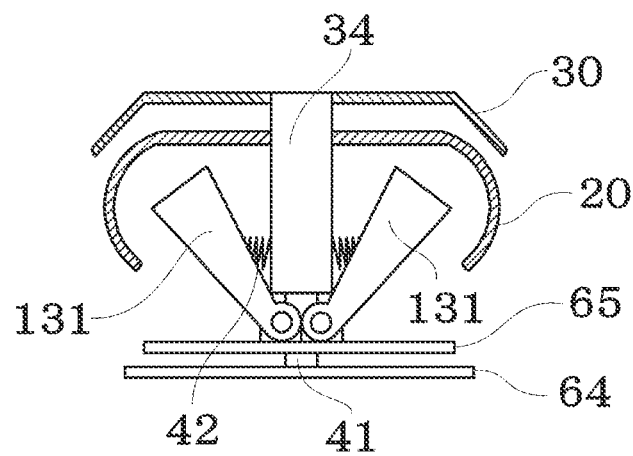
Figure 16C:
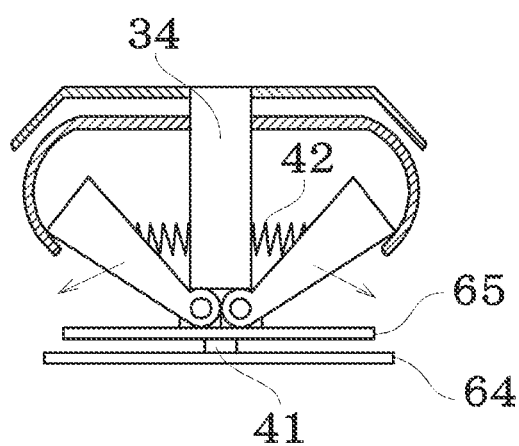

FIGS. 16A to 16C illustrate an embodiment 8.

The present embodiment is the example in which the bell main body 20 is in the bowl shape opened on the lower side and a plurality of hitting elements 131 are disposed on the inner side.

For the hitting elements 131, a pair of two, left and right hitting elements 131 and 131 are connected opposite to each other by the spring 42 in FIG. 16.

The hitting member 30 is connected to a hollow shaft 34 and the hollow shaft 34 is freely slidably connected with the shaft 41 which is provided inner side of the hollow shaft 34.

The lower end of the shaft 41 is connected and fixed to a base member 64 on the attaching tool side, and lower ends of the hitting elements 131 are pivotally fixed to a sub base member 65 arranged on the upper side of the base member 64.

Thus, while the pair of the hitting elements 131 and 131 are separated from the inner side of the bell main body 20 by tractive force of the spring 42 in the state of FIG. 16B, when the hitting member 30 is hit and lowered as illustrated in FIG. 16C, the pair of hitting elements 131 and 131 hit by the lower end of the hollow shaft 34 are moved to spread from each other.

Thus, an upper end side of the hitting element 131 hits the bell main body 20 and the bell is rung.

Figure 17A:
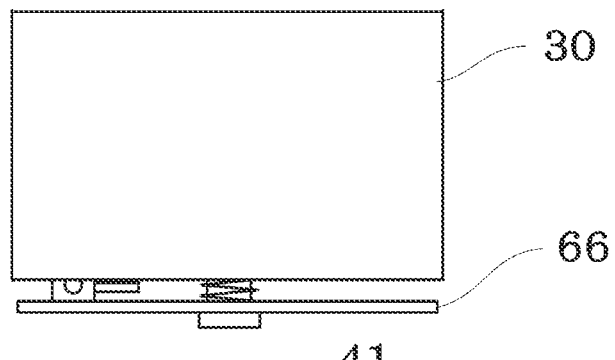
FIGS. 17A to 17C illustrate an example of arranging the bell main body on an inner side of the hitting member formed of a case body (embodiment 9).
Figure 17B:
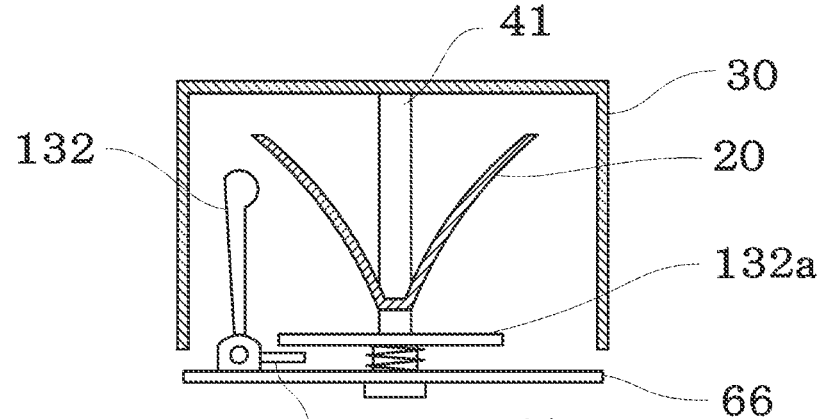
Figure 17C:
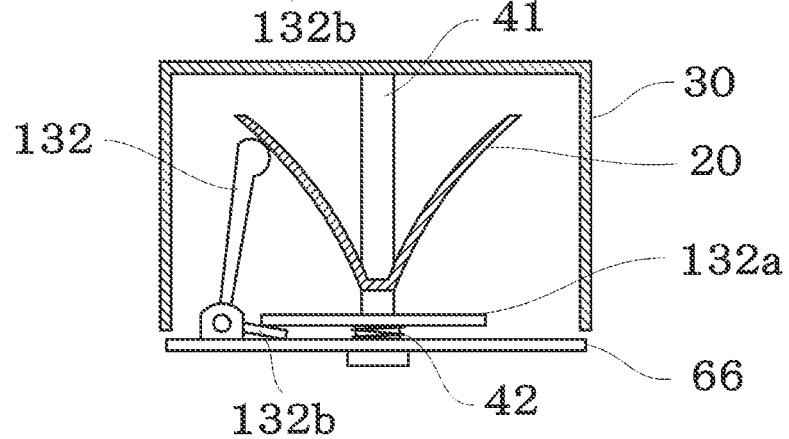

FIGS. 17A to 17C illustrate an embodiment 9.

The present embodiment is the example in which the hitting member 30 is turned to a cylindrical case body opened at a lower portion.

The example is such that, on the inner side of the case body, the bell main body 20 is attached via the shaft 41 supporting the case body.

The shaft 41 is connected to a base member 66 on the attaching tool side in the state of being energized upwards by the spring 42.

To the shaft 41, a hitting board 132a is connected.

In addition, the example is such that a roughly L-shaped hitting element 132 is pivotally fixed to the base member 66, and when the hitting board 132a hits an operation rod 132b of the hitting element 132, the distal end side of the hitting element 132 hits the bell main body 20.

Figure 18A:
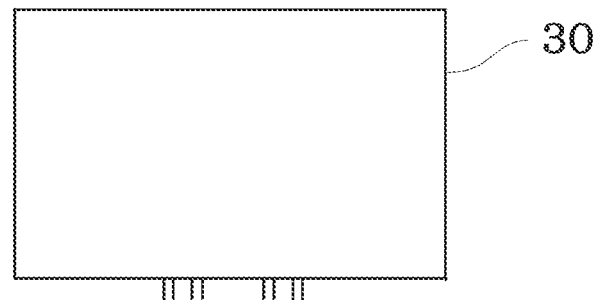
FIGS. 18A to 18C illustrate an example of arranging the bell elements on the inner side of the hitting member formed of the case body (embodiment 10).
Figure 18B:
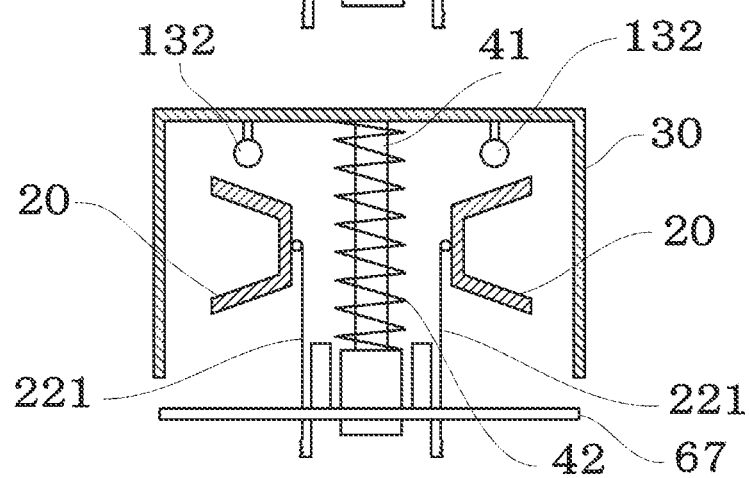
Figure 18C:
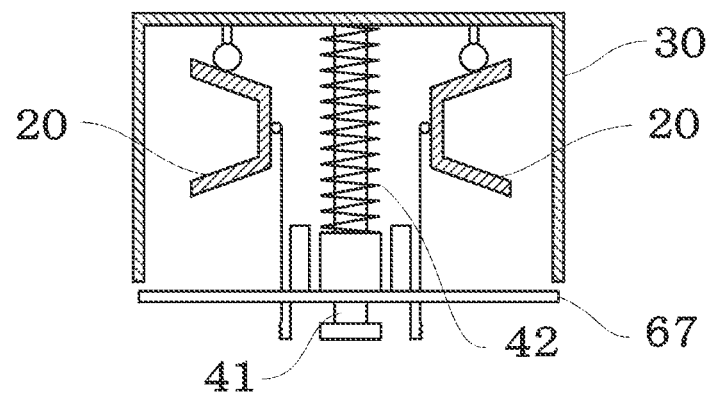

FIGS. 18A to 18C illustrate an embodiment 10.

The present embodiment is the example in which bell elements 20 are erected from a base member 67 on the attaching tool side by an elastic member 221 such as a wire, and the bell elements 20 are disposed on the inner side of the hitting member 30 formed of the case body.

In the present embodiment, the hitting elements 132 are disposed on a ceiling surface on the inner side of the case body, and when the hitting member is lowered, the hitting elements 132 hit the bell elements 20 supported by the wire and the sound is made.

Figure 19A:
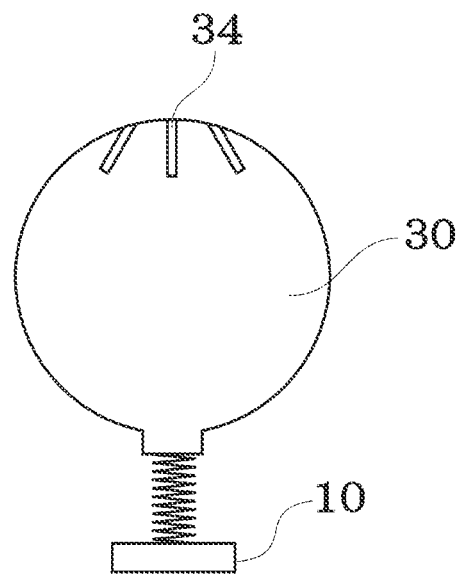
FIGS. 19A and 19B illustrate an example in which the hitting member formed of the case body is in a spherical shape (embodiment 11).
Figure 19B:
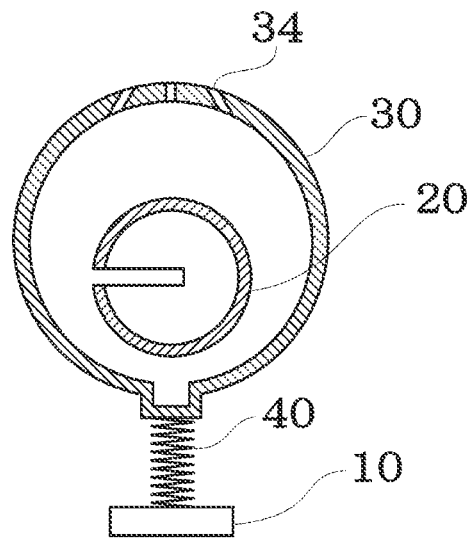

FIGS. 19A and 19B illustrate an embodiment 11.

Since the present disclosure is characterized in that the hitting member is in the plate shape or is the case body, the present embodiment is the example in which the hitting member 30 is turned to the case body in the spherical shape.

The hitting member 30 is elastically supported by the attaching tool 10 by the elastic supporter 40 such as a spring.

The example is such that the bell main body 20 in a bell shape is freely movably incorporated on the inner side of the hitting member 30 formed of the case body.

Thus, when the elastically supported spherical hitting member 30 that is hollow inside is lightly hit, an incorporated spherical bell (20) rolls and the sound is made.

In addition, on the hitting member 30, slits 34 are made so that the sound is easily made. Since the sound is made just by lightly hitting the hitting member, the bell according to the present disclosure can be utilized as the bell for various kinds of bicycles.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A bell for a bicycle, comprising:
   an attaching tool configured to be attached to a handle of the bicycle;
   a bell main body directly or indirectly connected to the attaching tool; and
   a hitting member formed by a plate body disposed above the bell main body and arranged opposite to the bell main body at a predetermined interval, and configured to hit and ring the bell main body in response to a user contacting the hitting member,
   a shaft member projecting downwardly from the hitting member, the shaft member being inserted into an insertion hole provided in the bell body and movable along the insertion hole in response to a user contacting the hitting member; and
   a spring arranged on an outer periphery of the shaft member, which biases the hitting member in a direction away from the bell body,
   wherein the hitting member is elastically supported by the bell main body,
   wherein the bell body and the hitting member each have a circular shape, and;
   wherein the bell body has a ring-like raised portion along an outer peripheral edge of the plate body and a recessed portion formed inside the plate body.

2. The bell for a bicycle according to claim 1, wherein the bell main body is in a dish shape or a bowl shape.

3. The bell for a bicycle according to claim 1,
   wherein the hitting member has a plate-shaped base portion and a hitting projection along an outer periphery of the plate-shaped base portion at a position opposite the ring-like raised portion of the bell body.

4. The bell for a bicycle according to claim 1,
   wherein the bell body bas a supporter that protrudes from a lower surface of the bell main body and is supported by the attaching tool.

5. The bell for a bicycle according to claim 4,
   wherein the attaching tool includes a semicircular upper frame, a semicircular lower frame and a pivoter that supports the upper frame and the lower frame, the upper frame and the lower frame being openably and closably mounted with respect to the pivoter, and the upper frame has an attaching recessed portion into which the supporter of the bell body fits.

6. The bell for a bicycle according to claim 4,
   wherein that the insertion bole of the bell body is provided on the supporter.

7. The bell for a bicycle according to claim 6,
wherein the shaft member includes a fixed end fixed to the hitting member and a free end opposite the fixed end, the free end being provided with a head portion in a bolt shape, and
the insertion hole of the bell body being provided with a step,
wherein the head portion comes into contact with the step to keep the predetermined interval between the hitting member and the plate body.

* * * * *